(12) United States Patent
Strothmann et al.

(10) Patent No.: US 9,253,229 B1
(45) Date of Patent: Feb. 2, 2016

(54) CORRELATING VIDEO QUALITY WITH VIDEO PLAYBACK VIEW

(71) Applicant: Cox Communications, Inc., Atlanta, GA (US)

(72) Inventors: James Alan Strothmann, Johns Creek, GA (US); Stephen Kent Necessary, Alpharetta, GA (US); Yousef Wasef Nijim, Roswell, GA (US); Jay Paul Langa, Cumming, GA (US)

(73) Assignee: Cox Communications, Inc., Atlanta, GA (US)

( * ) Notice: Subject to any disclaimer, the term of this patent is extended or adjusted under 35 U.S.C. 154(b) by 423 days.

(21) Appl. No.: 13/735,443

(22) Filed: Jan. 7, 2013

(51) Int. Cl.
*G06F 15/16* (2006.01)
*H04L 29/06* (2006.01)
*H04N 21/2662* (2011.01)

(52) U.S. Cl.
CPC ........ *H04L 65/4069* (2013.01); *H04N 21/2662* (2013.01)

(58) Field of Classification Search
CPC .................... H04N 21/2662; H04L 65/4069
See application file for complete search history.

(56) References Cited

U.S. PATENT DOCUMENTS

2009/0216897 A1\* 8/2009 Wang ............................ 709/231
2013/0163430 A1\* 6/2013 Gell et al. ..................... 370/235

\* cited by examiner

*Primary Examiner* — Yves Dalencourt
(74) *Attorney, Agent, or Firm* — Merchant & Gould (57) ABSTRACT

Video streaming is delivered through a communication network to one or more client computing devices/systems. A number of video display or bandwidth control profiles are used in part to control an amount of bandwidth used by each client to stream video at various quality levels or audio-only. Video display profiles can be configured according to a particular device/system being used to stream video.

20 Claims, 7 Drawing Sheets

CORRELATING VIDEO QUALITY WITH VIDEO PLAYBACK VIEW

BACKGROUND

As communication networks and video transmission techniques continue to advance, video streaming capability has enabled users to view live and pre-recorded broadcasts, such as on-demand television series, sporting events, and other video events using devices such as smartphones, tablet computers, and laptop computers. However, transmitting video can be costly in terms of consuming large amounts of bandwidth, which may lead to an unacceptable video streaming experience. Routine maintenance and testing of network equipment such as routers, hubs, switches, bridges and cabling is recommended to provide a quality streaming experience.

Data usage is the amount of data, sometimes referred to as bandwidth that customers consume when sending, receiving, downloading, or uploading information. Customer data usage may encompass the transmission of images, personal videos, streaming video, movies, photos, online time, call time, application and system updates, etc. Packet-switched networks, such as the Internet, wireless communication, ADSL and CATV, provide infrastructure that enables video streaming operations.

The widespread use of content distribution networks (CDNs) are utilized in attempting to efficiently provide content to requesting clients. Currently, there is not a mechanism in place to manage data bandwidth for streaming video while a customer has lost focus while watching streaming video, either by reducing the size of a playback window or sending a media player to the background. Unfortunately, the same amount bandwidth is consumed regardless of the user focus. By allocating unnecessary amounts of bandwidth, a service provider may find difficulty in maintaining service quality across a customer base.

SUMMARY OF THE INVENTION

To overcome the limitations described above, and to overcome other limitations that will become apparent upon reading and understanding the present specification.

Embodiments provide for controlling and/or managing video streaming operations based in part on aspects of a communication network and/or a video playback view or window, wherein a number of video display profiles are used in part as a mechanism for adjusting video streaming parameters, but the embodiments are not so limited. A method of an embodiment operates to control a delivery of video over an IP network to a user device/system, wherein the method is configured in part to adjust video transmission parameters based in part on the network conditions and/or a size of a video playback window being displayed with a user device/system. The method of an embodiment accounts for video playback view resizing operations in part to control the quality of delivered video and/or audio by dynamically adjusting the communication bandwidth used to stream content, including video, to consumers.

In another embodiment, a system includes at least one server for delivering video to IP-enabled components and is configured to adjust transmission parameters based in part on network conditions and/or a size of a media player video window. The system of an embodiment is configured to adjust the transmission rate to a lower or a higher rate as a user resizes a viewing window from one size to another.

A computer readable medium of an embodiment includes instructions that operate to deliver video over an IP network to a device/system using a bandwidth control algorithm that uses a number of video display profiles to account for video playback conditions, including network conditions, user actions, sizes and/or configurations of a video playback window, etc. The computer readable medium includes instructions executable by a processor to control and/or adjust video streaming parameters as a user interacts with a video playback window.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Figure 1:
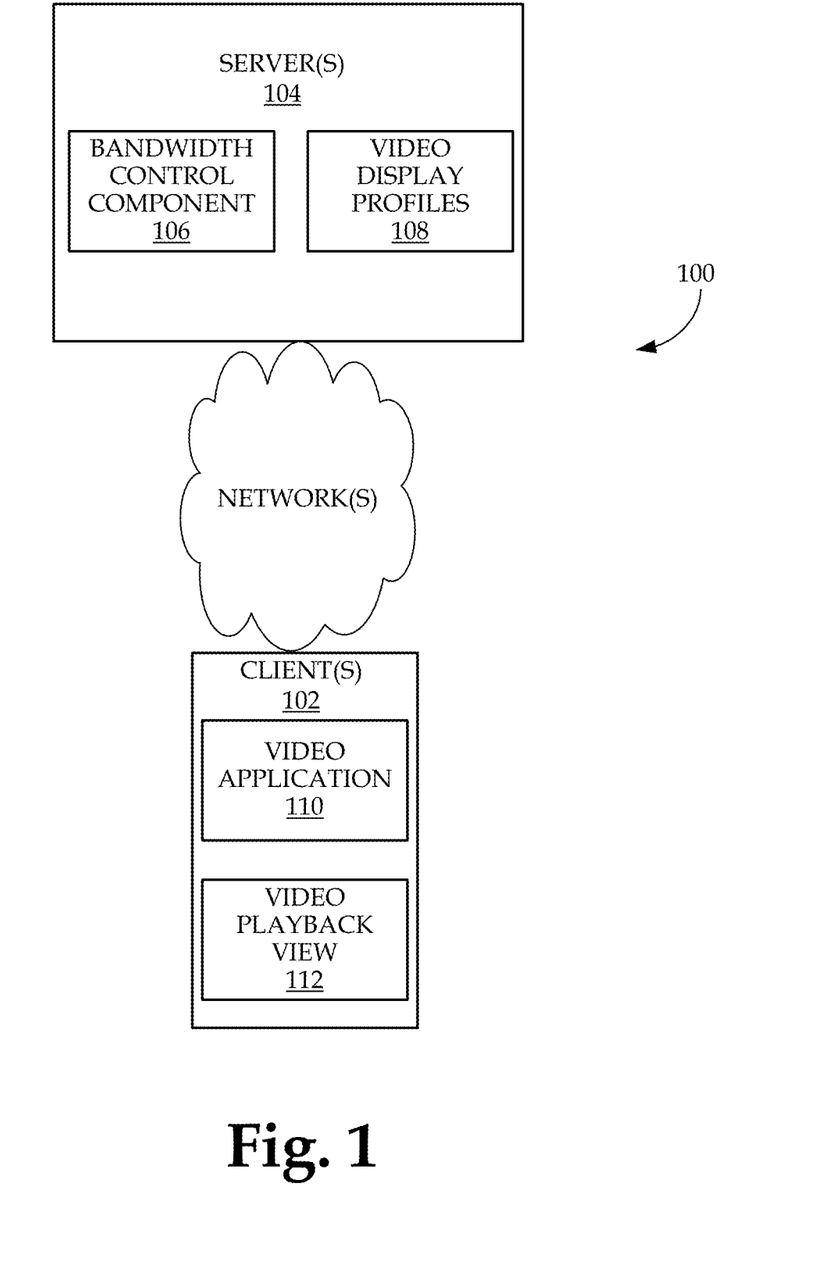
FIG. 1 is a simplified block diagram depicting aspects of a client-server communication architecture according to an embodiment.

FIG. 1 is a simplified block diagram depicting aspects of a client-server communication architecture 100 including a client computing device or client 102 and server computer or server 104 according to an embodiment. Components of the exemplary communication architecture 100 of an embodiment operate to provide video transmission and/or reception functionality while managing amounts of communication bandwidth used to stream video using the client 102 (e.g., smartphone, smart television, tablet computer, game console, laptop, desktop, etc.) and server 104.

The client-server communication architecture 100 can include wireless and/or wired communication components as used in the art today. For example, a cable or other service provider can use components of the client-server communication architecture 100 as part of delivering video over IP to subscribing customers. As a current subscriber offering, video over IP network infrastructure allows a service provider to provide services such as allowing subscribers to watch live television on a user device, such as a tablet computer, smartphone, or other video capable device.

The server 104 of an embodiment includes a bandwidth control algorithm or component 106 configured to control and/or manage amounts of available bandwidth allocated to clients or other components. The server 104 also includes a number of video display profiles 108 that can be pre-generated or dynamically generated based in part on a type of a requesting device/system. The server 104 can provide one or more video display profiles 108 to the client 102 at various times, including at login and/or as a device configuration changes or upon some other instance.

Each client 102 can store any corresponding video display profile locally or remotely for accessing during video streaming operations using a video application 110 or other functional video playback component and video playback view or window 112. For example, one or more end-users can use a video streaming application to stream live television events and pre-recorded videos at a household or business at one time. Parameters of each video display profile can be used to control an amount of bandwidth used by each user based in part on the size and/or configuration of a video playback view or window 112, as described below. While one client and server are shown in FIG. 1, it will be appreciated that a complex communication network includes a number of associated network-enabled components, including hardware and software components, that can include a plurality of networked servers, routers, switches, modems, and/or client devices/systems.

As described briefly above, components of the exemplary communication architecture 100 can be used to manage communication traffic and/or network bandwidth as users stream video to one or more user devices/systems, but are not so limited. For example, components of the communication architecture 100 can be configured to manage and control delivery of on-demand cable and television services, including providing video over an IP network, to any compatible user device/system, such as smart televisions, tablet computers, and smartphones to name a few examples having compatible video playback functionalities.

As described briefly above, components of the communication architecture 100 can use one or more video display or bandwidth control profiles in part to dynamically adjust the communication bandwidth used by video consumers to stream video to one or more user devices/systems. Depending in part on network conditions and particular device/system type(s) and/or display configuration(s), video display profile parameters can be used to dynamically control bandwidth usage as the user adjusts a size of the video playback window 112, opens other windows or applications, moves the video playback window 112 to the background, minimizes the video playback window 112, loses focus on the video playback (e.g., leaves the viewing area, uses another application, etc.), or the like.

The client 102 can use video display profiles to adjust video quality based in part on the profile information that includes video streaming bit rate parameters to use according to one or more of current network congestion information, and/or a size and/or configuration of the video playback window 112, and/or some other criteria. For example, information associated with a video display profile can be used to dynamically decrease and/or increase a communication bit rate as a user adjusts video playback, adjusts a size of a window or view displaying video, stops streaming video while continuing to stream audio, and/or stops video and audio based on the customer behavior as part of managing amounts of available communication bandwidth used for streaming and/or other operations.

As an example, different video display profiles can be provided and/or used based in part on a device and/or display type, network conditions (e.g., congestion, packet loss, etc.), available bandwidth amounts, and/or a size and/or configuration of a video playback window or other interface. For example, a video display profile can include different communication bit rates to be used dynamically as a user resizes and/or otherwise interacts with a video playback window or other associated window. Different video display profiles can be configured to operate with a particular device or system. For example, a tablet computer may use different video display profiles as compared with a laptop computer or a smart television that include different communication and/or display functionalities.

According to an embodiment, the client 102 can be configured to provide feedback parameters regarding device type and/or configuration information, display type and/or configuration information, and/or other information such as display parameters associated with a video playback window (e.g., current size (e.g., horizontal and/or vertical parameters), in-focus, partially occluded, etc.) to an associated platform, content delivery network (CDN), server 104, or other component to use when identifying video display profiles as part of controlling adaptive bit rate communication parameters. In one embodiment, once device and/or display information is known, the server 104 can package and send several video display profiles for use by a particular device/system type and/or video display application and/or other component to manage streaming operations.

The client 102 of an embodiment can be configured to select a correct video display profile from several different profiles based in part on network congestion, available bandwidth, and/or aspects of a video playback window or associated component, and dynamically adjust a bit rate used to stream the video. The bit rate adjustments can be made locally by the client 102 or controlled remotely by the server 104. For example, as a customer changes a media player window size, the video display profiles can be used to change the adaptive bit rate according to the window size and the network bandwidth or congestion.

Thus, based in part on use and configuration of the video display profiles 108, demand on the network may be reduced and streamlined by using parameters of one or more video display profiles 108 to adaptively adjust a streaming bit rate based on a current and/or modified window size. The architecture 100 provides a mechanism that allows for continuous feedback to a back office or other component from the client 102 and enables video quality adjustments based on a video playback window configuration and/or user status. For example, a customer that adjusts a video playback window to a smaller size has probably lost interest in watching high quality video such that corresponding parameters of a video display profile can be used to reduce the video streaming bit rate since the customer may be opening other windows, shifting focus to another application, or interested in listening to audio rather than watching the video.

As part of managing allocations of communication bandwidth, parameters of the video display profiles 108, network congestion profiles, and/or other profile types can be used in part to adjust the bit rate to a lower or a higher value based on what the user is doing in relation to video playback. For example, the server 104 may provide five different video display profiles to manage delivery of a video stream to a user's tablet computer including one audio only profile and four different video streaming bit rate profiles. The five video display profiles may be generated on the assumption that a video playback window is initially maximized and/or there is little or no network congestion and/or stable network conditions.

According to certain embodiments, network congestion profiles can be created, integrated, and/or used to manage streaming and other network operations according to particular network conditions. Additionally, screen size or display size profiles can also be used to dynamically adjust the streaming bit rate according to a fixed screen size or display size of a particular playback device. As an example, a screen size profile can be implemented as part of a user flicking/moving action to move video playback from a first viewing device (e.g., a tablet screen) to a second viewing device (e.g., a smart television screen). A screen size profile associated with the dimensions of the smart television screen can be used after the move/flick operation.

In accordance with one embodiment, a weighting algorithm or real time modeling method can be used to control streaming parameters according to a weighted combination of two or more streaming control profiles (e.g., network congestion profile(s), window size profiles(s), screen size profile (s), etc.). For example, assume that network congestion occurs at the same time as a user changes the size of a playback window which causes a network congestion profile to be flagged for use along with a window size profile. Depending on the implementation preference, a statistical method can be used to reflect changes in the window size and bandwidth congestion, wherein a higher weight can be used for the network congestion profile than for the window size profile (e.g., adjust the bit rate based on 70% dependence on bandwidth and 30% dependence on window size). In an embodiment, display profiles can be generated and used that include multiple parameters including screen size, window playback size, and/or network congestion parameters rather than implementing multiple different profile types.

As the customer reduces the video playback window size, a video display profile can be selected for the changed window size that includes a streaming bit rate that is less that the bit rate used for a larger or maximum window size assuming that network conditions are unchanged or stable. Accordingly, the video quality can be controlled to drop one or more profile levels until an audio-only profile is used as the customer changes the video playback window size. In similar fashion, if the customer puts the player in the background or minimizes the player, then the audio only profile can be used to consume a relatively small amount of bandwidth and thereby reduce unnecessary use of available bandwidth.

Rather than, or in addition to, the server 104 using the bandwidth control component 106 to control video playback quality parameters, the client 102 of an embodiment can be configured to automatically adjust and change video quality or adjust the bit rate based in part on an associated size of a video playback window. The client 102 of one embodiment can also be configured to dynamically and automatically downshift to a lower bit rate using a locally stored video display profile or select a different video display profile having even more constrained bit rate thresholds when a video playback window is reduced from one size to a smaller size. The server 104 of an embodiment can be configured as an application server that can be used to generate and/or provide the video display profiles 108 that include adjustable bit rate and/or video quality parameters.

Additionally, the video display profiles 108 can be used to reduce the bit rate when a customer opens more than one window and the video playback window 112 loses focus because there are other windows open on the top of the video playback window 112, or the media player window is partially covered or occluded by other windows, then a lower video quality can be provided by dropping to a lower bit rate video display profile. Thus, the client 102 can be configured to use a video display profile to adjust and change video quality or an adjusted bit rate based on the window focus even if the size has not been changed (e.g., user is using another input device (e.g., keyboard, camera, mouse, etc. or application, etc.). Window focus, configuration, and other detection methods can be included as part of the functionality of a client video application or any other available operating system or other component.

Video display profiles 108 can also be used for detection methods that utilize a camera or other detection device integrally disposed or coupled to the client 102. For example, if the camera is on and video is playing in a media playback window, then the video application 110 can be configured to detect through the camera the focus of a user watching video. If the user is fully engaged watching video, then the video application 110 can use a video display profile to allocate a maximum amount of available bandwidth for a particular device, accounting for any network congestion. If the camera is used to detect that the user is losing focus, or has moved away from the device, then the video application 110 can be configured to select a video display or quality profile depending on the behavior of the customer. For example, if the customer is not watching video and left the room, then the video application 110 can identify and select an audio only profile to use until the user returns to the viewing area.

With continuing reference to FIG. 1, the server 104 of an embodiment uses the bandwidth control component 106 in part to control video streaming operations using parameters of a number of video display profiles 108, but is not so limited. For example, the server 104 can use parameters of a particular video display profile to control the bit rate for streaming video based in part on a corresponding device/system type. Video display profiles 108 can be generated to include video window size to bit rate correlations that can be used to control amounts of available bandwidth allocated and/or used by each client.

As an example, a video display profile can be generated for a tablet computer that defines streaming parameters or a range of streaming parameters (e.g., bit rates) to use by the tablet computer when streaming the video, wherein the bit rates (e.g., high to low) correspond with the window size or orientation of the video playback window. As another example, a subscriber can request and stream live television to a video playback window of the tablet computer using a wireless network, wherein a video display profile for the tablet computer can be used to control the video stream as the user resizes or otherwise interacts with the tablet computer. If a user shifts focus to another application or leaves the area, a video display profile that includes a lower bit rate can be used (e.g., or just audio) to reduce the streaming load on the network and thereby conserve bandwidth.

The server 104 can be configured to maintain and/or provide one or more video display profiles 108 based in part on subscriber device types (e.g., smart television, smartphone, tablet, desktop, laptop, etc.) and/or subscription plans since subscription types can be tailored to allow for better quality of service than others. It will be appreciated that dedicated components other than, or in addition to the server 104 of the exemplary communication architecture 100 can be used to authenticate and/or provide other services in conjunction with video streaming capabilities. The server 104 of an embodiment is configured to use the bandwidth control component 106 and/or bit rate control parameters of the video display profiles 108 to allocate and/or control video streaming bit rates used to display video using a media, video, browser, or other video playback mechanism.

The video display profiles 108 (see FIG. 2 for example) can be generated to include, for example, a video streaming bit rate limit or range of bit rates that correlate with aspects of a video display, such as whether the video display or view is occluded, partially occluded, resized, not being used, etc. For example, a video playback window of a media player may open with default horizontal and/or vertical dimensions when a user plays a video. As the user resizes the video playback window, the server 104 can use the bandwidth control component 106 and parameters of a corresponding video display profile to change the streaming bit rate, such as by increasing the rate or decreasing the rate, so that a more efficient distribution of the bandwidth is maintained. Thus, issues associated with using more data bandwidth for streaming video while a customer resizes the video playback to a smaller size window.

Figure 2:
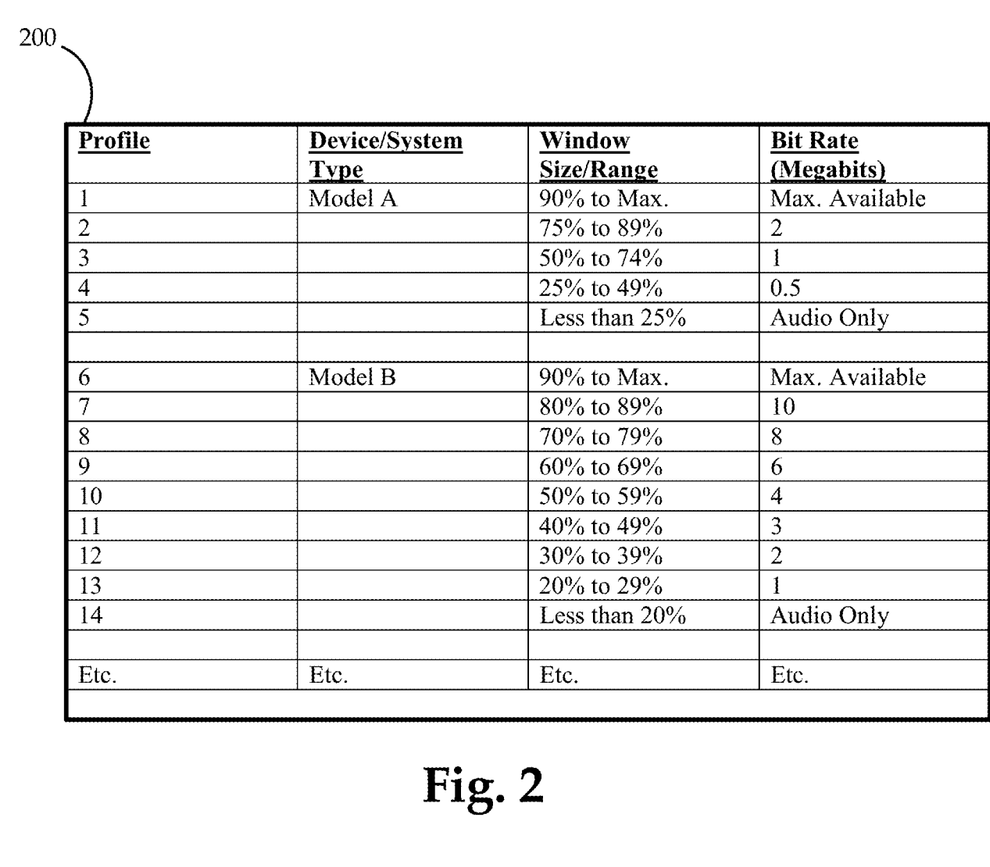
FIG. 2 depicts a number of exemplary video display or adaptive bit rate profiles according to an embodiment.

FIG. 2 depicts a number of exemplary video display or adaptive bit rate profiles 200 according to an embodiment. As described above, video display profiles 200 can be generated, maintained, and/or provided using a server or other component. As new user devices/systems become available, new and/or modified video display profiles can be added to the number of video display profiles 200. The video display profiles 200 can be stored in dedicated computer storage and/or distributed through a cloud.

As shown in FIG. 2, the exemplary video display profiles 200 correspond to particular device types and correlate video streaming parameters (bit rate) with a range of video playback view or window sizes. For this example, there are five video display profiles (Profiles 1-5) for a Model No. A device type. Profile 1 can be used for video playback window sizes of about ninety (90) percent of maximum size to maximum size which enables a video streaming rate at the maximum available bit rate. Profile 2 can be used for video playback window sizes of about seventy-five (75) percent of maximum size to about eighty-nine (89) percent of maximum size which enables a video streaming rate of two (2) Megabits per second.

Profile 3 can be used for video playback window sizes of about fifty (50) percent of maximum size to about seventy-four (74) percent of maximum size which enables a video streaming rate of one (1) Megabits per second. Profile 4 can be used for video playback window sizes of about twenty-five (25) percent of maximum size to about forty-nine (49) percent of maximum size which enables a video streaming rate of zero point five (0.5) Megabits per second. Profile 5 can be used for audio-only playback when the window size is reduced below about twenty-five (25) percent of maximum size.

It will be appreciated that a particular device may use many more video display profiles as compared with other devices. For example, a smart television may include twice as many video display profiles as compared to the video display profiles implemented for a tablet computer. Likewise, a tablet computer may include additional video display profiles as compared to video display profiles used for a smartphone. Video display profiles can be maintained using a master list and/or distributed throughout a network according to user device types, but are not so limited. Also, while the video display profiles 200 use window size correlations in part to adjust video streaming bit rates, as described above and below, other user actions can also be used to select and use a video display profile in order to efficiently allocate bandwidth. For example, the bit rate can be adjusted depending on a user focus or lack thereof.

Continuing with the example of FIG. 2, there are nine video display profiles (Profiles 6-14) for a Model No. B device type. Profile 6 can be used for video playback window sizes of about 90 percent of maximum size to maximum size which enables a video streaming rate at the maximum available bit rate. Profile 7 can be used for video playback window sizes of about eighty (80) percent of maximum size to about 89 percent of maximum size which enables a video streaming rate of ten (10) Megabits per second.

Profile 8 can be used for video playback window sizes of about seventy (70) percent of maximum size to about seventy-nine (79) percent of maximum size which enables a video streaming rate of eight (8) Megabits per second. Profile 9 can be used for video playback window sizes of about sixty (60) percent of maximum size to about sixty-nine (69) percent of maximum size which enables a video streaming rate of six (6) Megabits per second. Profile 10 can be used for video playback window sizes of about 50 percent of maximum size to about fifty-nine (59) percent of maximum size which enables a video streaming rate of four (4) Megabits per second.

Profile 11 can be used for video playback window sizes of about forty (40) percent of maximum size to about 49 percent of maximum size which enables a video streaming rate of three (3) Megabits per second. Profile 12 can be used for video playback window sizes of about thirty (30) percent of maximum size to about thirty-nine (39) percent of maximum size which enables a video streaming rate of 2 Megabits per second. Profile 13 can be used for video playback window sizes of about twenty (20) percent of maximum size to about twenty-nine (29) percent of maximum size which enables a video streaming rate of 1 Megabits per second. Profile 14 can be used for audio-only playback when the window size is reduced below about 20 percent of maximum size.

Figure 3:
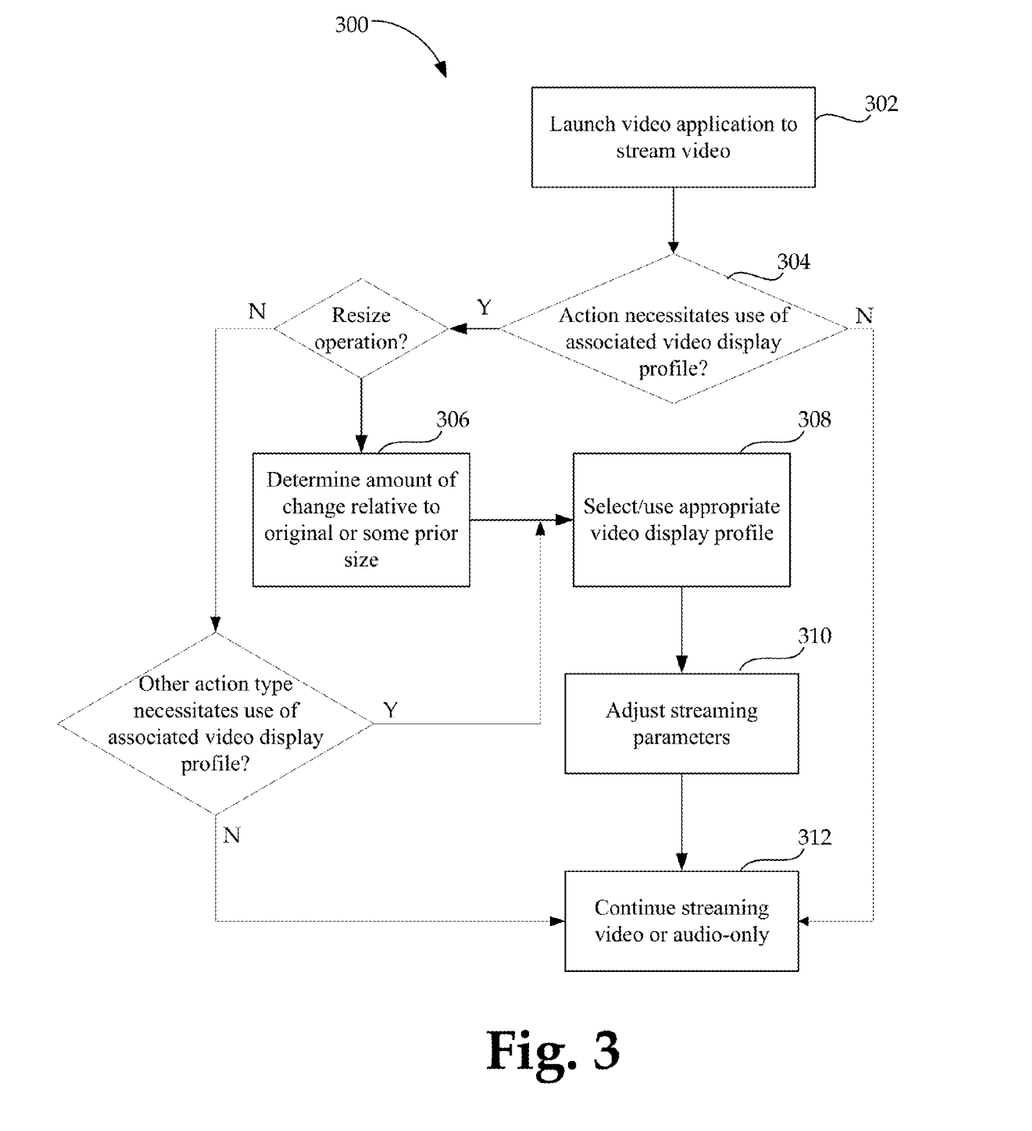
FIG. 3 is a flow diagram illustrating an exemplary process of streaming video using a communication network.

FIG. 3 is a flow diagram illustrating an exemplary process 300 of streaming video using a communication network, including IP-enabled components according to an embodiment. At 302, the process 300 begins upon launching a video application to stream video. For example, a user who has subscribed to services that include delivery of video using components of an IP network can use a tablet computer, smart phone, smart television, desktop computer, and/or any other device capable of displaying video to login and/or use one or more video display profiles to stream selected live and pre-recorded television events. As described above, video display profiles can be tailored to each device/system according to model, device type, or some other criteria and used to control aspects of a communication stream based in part on actions associated with the video application, video playback window or viewing portal, or some other application or component.

At 304, the process 300 operates to determine if an action necessitates use of an associated video display profile. For example, the process 300 at 304 can use outputs from an operating system or other component as a result of a user action or input to determine whether certain streaming parameters are to be used to stream the video at various quality levels or provide an audio-only stream. If the action necessitates use of a video display profile and is a resize operation, the process 300 proceeds to 306 and operates to determine the amount of change or percentage of change as compared to the original or some prior size of a video playback window. For example, a user may grab a corner of the video playback window and reduce the size in order to multitask, wherein the resized dimensions of the video playback window are used for determining an appropriate video display profile.

At 308, the process 300 operates to select an appropriate video display profile or automatically implement streaming parameters of the appropriate video display profile based on aspects of the resized video playback window. For example, the process 300 at 308 can select a video display profile resulting in a higher streaming bit rate if a user has enlarged the video playback window or to a lower streaming bit rate if the user has reduced the video playback window. In one embodiment, at 308 the process 300 can use a server component to provide an appropriate video display profile using resize feedback from the client. Alternatively at 308, a client can download video display profiles for a particular streaming device beforehand or on the fly and select the appropriate video display profile based on the resize operation.

At 310, the process 300 operates to adjust the streaming parameters based in part on the corresponding bit rate of the selected video display profile. In an embodiment, the process 300 at 310 uses one or more server components as part of controlling and adjusting the bit rate based on the selected video display profile including compensating for network conditions. The process 300 of another embodiment at 310 can implement features of a client receiving device/system to control the streaming bit rate locally using the selected video display profile.

For example, a client computing device, set-top box, modem or other component can be configured with a bandwidth limiter or other component used in conjunction with a selected video display profile to control the streaming bit rate. A bandwidth limiter enables traffic control and monitoring functionality and can be used to control download upload and/or download communication rates and/or limits for associated applications. At 312, the process 300 operates to continue streaming the video and/or audio depending in part on the selected video display profile.

Referring again to the process 300 at 304, if the action is not a resize operation and the action type otherwise necessitates use of an associated video display profile, the process 300 returns to 308 and operates to select or automatically implement streaming parameters of an appropriate video display profile based on the corresponding action. For example, an audio-only streaming profile can be selected by the process 300 at 308 as part of using a video camera, whether integrated or otherwise coupled, to detect that a user has left the viewing area or is otherwise unfocused on a video playback window. As another example, the process 300 at 308 can operate to automatically use streaming parameters of a lower quality video display profile when a user changes focus by opening or using another application.

The process 300 proceeds to 310 to adjust the streaming parameters based in part on the corresponding bit rate of the selected video display profile. With continuing reference to the process 300 at 304, if the action does not necessitate use of an associated video display profile, the process 300 proceeds to 312 and continues streaming the video and/or audio. It will be appreciated that other types of video display profiles can be used including profiles that are built around network conditions accounting for delay, jitter, loss, etc.

Figure 4:
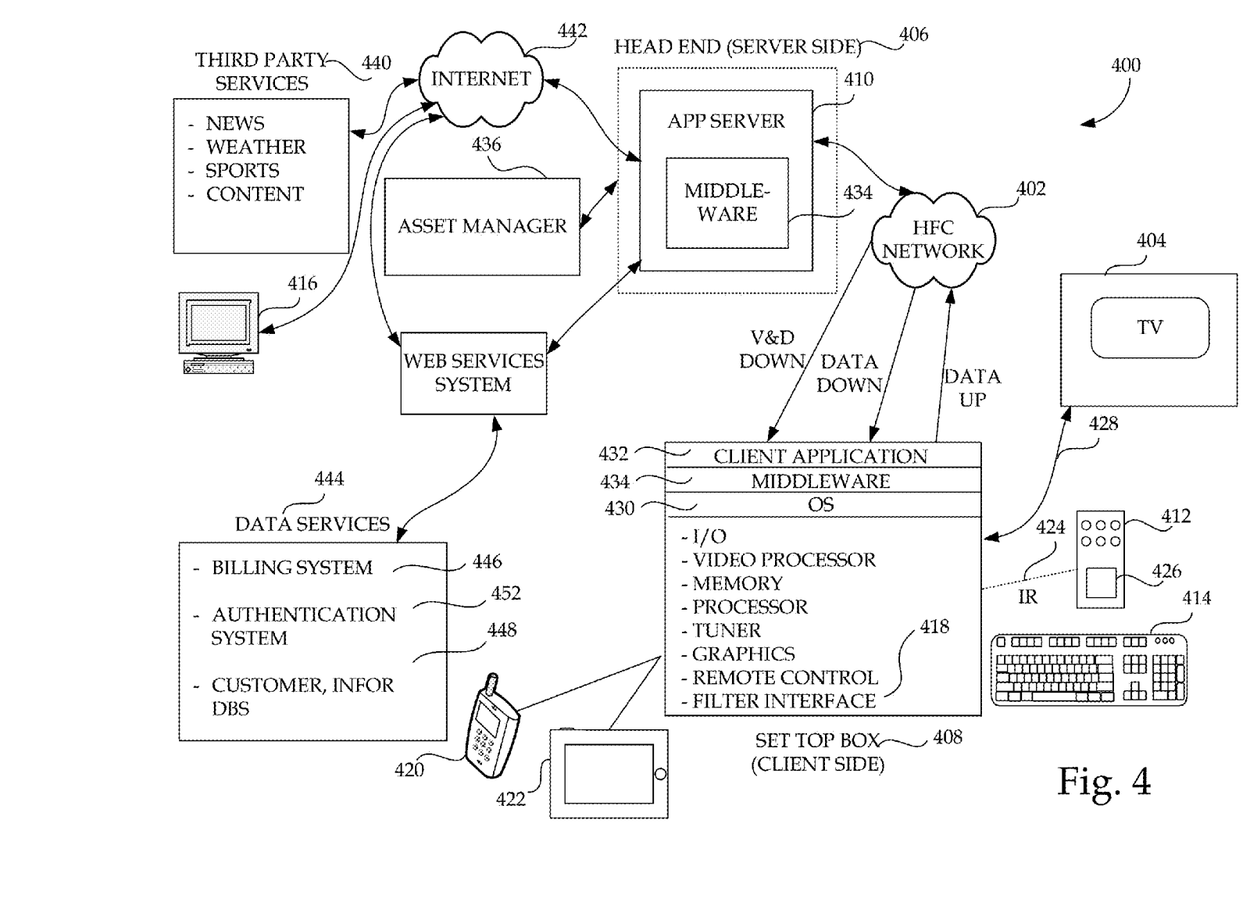
FIG. 4 depicts components of an exemplary communication architecture providing an operating environment according to an embodiment.

FIG. 4 depicts components of an exemplary communication architecture 400 providing an operating environment according to an embodiment. The architecture 400 includes components that provide cable television/services (hereafter referred to as "CATV") and IP communication functionality that can be used in part to deliver live video streaming features. As described below, the architecture 400 can use a number of video display or bandwidth control profiles to control amounts of available bandwidth consumed by streaming users, but is not so limited. For example, a service subscriber can use an IP-enabled set top box and/or a wireless local area network (WLAN) to stream video to multiple user devices/systems.

As shown in FIG. 4, digital and analog video programming, information content, and interactive television services are provided via a hybrid fiber coax (HFC) network 402 to a television 404, such as a smart television for example, for consumption by a cable television/services system customer. HFC networks combine both optical fiber and coaxial cable lines. Typically, optical fiber runs from the cable head end 406 to neighborhoods of subscribers. Coaxial cable runs from the optical fiber feeders to each customer or subscriber. The functionality of the HFC network 402 allows for efficient bidirectional data flow between a client-side set-top box (STB) 408 and a server-side application server 410 according to an embodiment.

The architecture 400 is configured as a distributed client-server computing architecture for providing video and data flow across the HFC network 402 from server-side services providers (e.g., cable television/services providers) via a server-side head end 406 and a client-side customer via the client-side set-top box (STB) 408 or other component functionally connected to a customer receiving device, such as a smart television set 404 or other device for example. Modern CATV systems may provide a variety of services across the HFC network 402 including digital and analog video programming, telephone services, high speed Internet access, video-on-demand, live video streaming, and/or information services.

On the client side of the architecture 400, digital and analog video programming and digital and analog data are provided to the customer via the set-top box STB 408. The STB 408 of an embodiment can be configured to be IP-enabled and/or otherwise configured to deliver IP television services to provide live video streaming capability for users to stream video to multiple user devices/systems. As described above, video display profiles for various user devices/systems can be configured in part to control video quality as part efficiently managing network bandwidth.

Interactive television services that allow a customer to input data to the architecture 400 likewise are provided by the STB 408. As shown in FIG. 4, the STB 408 of an embodiment is configured as a multipurpose computing device having at least one computer processor, memory, and/or input/output mechanism(s) and functionalities. An input/output mechanism receives input from server-side processes via the HFC network 402 and from customers via input devices such as the remote control device 412, keyboard 414, or other computing device/system 416, such as a tablet/slate computer, smart phone, etc.

STB 408 of an embodiment provides a filter interface 418 for presenting filtered programming and/or content via STB 408 to the TV 404. While the filter interface 418 may be implemented using a STB, the filter interface 418 may also be provided using a wireless device 420, any type of network media device 422, or any device capable of interfacing with a STB 408 or in a server or other module on the head end side 406. Compatible devices may include DVRs, wireless phones, PCs, laptop computers, tablet/slate computers, media viewing devices, or equivalents thereof.

The remote control device 422 and the keyboard 414 may communicate with the STB 408 via a suitable communication transport such as the infrared connection 424. The remote control device 422 may include a biometric input module 426. The STB 408 also includes a video processor for processing and providing digital and analog video signaling to the television set 404 via a cable communication transport 428. A multi-channel tuner is provided for processing video and data to and from the STB 408 and the server-side head end system 406, described below.

The STB 408 also includes an operating system 430 for directing the functions of the STB 408 in conjunction with a variety of client applications 432. For example, if a client application 432 requires a news flash from a third-party news source to be displayed on the television 404, the operating system 430 may cause the graphics functionality and video processor of the STB 408, for example, to output the news flash to the television 404 at the direction of the client application 432 responsible for displaying news items.

Because a variety of different operating systems 430 may be utilized by a variety of different brands and types of set-top boxes, a middleware layer 434 may be provided to allow a given software application to be executed by a variety of different operating systems. According to an embodiment, the middleware layer 434 may include a set of application programming interfaces (APIs) that are exposed to client applications 432 and operating systems 430 that allow the client applications to communicate with the operating systems through common data calls understood via the API set.

As described below, a corresponding middleware layer is included on the server side of the architecture 400 for facilitating communication between the server-side application server and the client-side STB 408. The middleware layer 434 of the server-side application server and the middleware layer 434 of the client-side STB 408 may format data passed between the client side and server side according to a markup language such as Extensible Markup Language (XML) for example.

According to one embodiment, the STB 408 passes digital and analog video and data signaling to the television 404 via a one-way communication transport. According to other embodiments, two-way communication transports may be utilized, for example, via high definition multimedia (HDMI) ports. The STB 408 may receive video and data from the server side of the architecture 400 via the HFC network 402 through a video/data downlink and data via a data downlink. The STB 408 may transmit data from the client side to the server side via the HFC network 402 via one data uplink. The video/data downlink is an in band downlink that allows for digital and analog video and data signaling from the server side of the architecture 400 using the HFC network 402 to the STB 408 for use by the STB 408 and for distribution to the television set 404. An in band signaling space operates at a relative high frequency, e.g., between 54 and 1000 megahertz. An exemplary signaling space is generally divided into 6 megahertz channels in which may be transmitted as a single analog signal or a greater number (e.g., up to ten) of digital signals.

The data downlink and the data uplink between the HFC network 402 and the STB 408 may comprise out of band data links. An out of band frequency range is generally at as a lower frequency than in band signaling. For example, the out of band frequency range may be between zero and 54 megahertz. Data flow between the client-side STB 408 and the server-side application server 410 can be passed through out of band data links. Alternatively, an in band data carousel may be positioned in an in band channel into which a data feed may be processed from the server-side application server 410 through the HFC network 402 to the client-side STB 408. Operation of data transport between components of the architecture 400 is well known to those skilled in the art.

With continuing reference to FIG. 4, the head end 406 is positioned on the server side and includes hardware and software systems responsible for originating and managing content for distributing through the HFC network 402 to client-side STBs for presentation to customers via television 404 or some other client device/system. As described above, a number of services may be provided by the architecture 400, including digital and analog video programming, interactive television services, telephone services, video-on-demand services, targeted advertising, and provision of information content. An asset manager 436 maintains content at the head end 406. The asset manager 436 may also include a decision server for processing rules and other input to determine what content to provide.

The application server 410 can be configured as a computing system operative to assemble and manage data sent to and received from the client-side STB 408 via the HFC network 402. As described above with reference to the STB 408, the application server 410 includes a middleware layer 434 for processing and preparing data from the head end for receipt and use by the client-side STB 408. For example, the application server 410 via the middleware layer 434 may obtain data from third-party services 440 via the Internet 442 for example and transmit to a customer through the HFC network 402 and the STB 408. For example, a weather report from a third-party weather service may be downloaded by the application server via the Internet 442. When the application server 410 receives the downloaded weather report, the middleware layer 434 may be utilized to format the weather report for receipt and use by the STB 408.

According to one embodiment, data obtained and managed by the middleware layer 434 of the application server 410 is formatted using XML and passed to the STB 408 where the XML-formatted data may be utilized by a client application 432 in concert with the middleware layer 434, as described above. As should be appreciated by those skilled in the art, a variety of third-party services data, including news data, weather data, sports data and other information content may be obtained by the application server 410 via distributed computing environments such as the Internet 442 for provision to customers via the HFC network 402 and the STB 408.

According to various embodiments, the application server 410 obtains customer support services data, including billing data, information on customer work order status, answers to frequently asked questions, services provider contact information, and the like from data services 444 for provision to the customer via an interactive television or other session. The services provider data services 444 include a number of services operated by the services provider of the architecture 400 which may include data on a given customer.

A billing system 446 may include information such as a customer's name, street address, business identification number, Social Security number, credit history, and information regarding services and products subscribed to by the customer. According to embodiments, the billing system 446 may also include billing data for services and products subscribed to by the customer for bill processing, billing presentment and payment receipt.

A customer information database 448 may include general information about customers such as place of employment, business address, business telephone number, and demographic information such as age, gender, educational level, and the like. The customer information database 448 may also include information on pending work orders for services or products ordered by the customer. The customer information database 448 may also include general customer information such as answers to frequently asked customer questions and contact information for various service provider offices/departments. As should be understood, this information may be stored in a variety of disparate databases operated by the cable services provider.

As shown in the example of FIG. 4, a web services system 450 is illustrated between the application server 410 and the data services 444. According to embodiments, web services system 450 serves as a collection point for data requested from each of the disparate data services systems comprising the data services 444. According to various embodiments, when the application server 410 requires customer services data from one or more of the data services 444, the application server 410 passes a data query to the web services system 450. The web services system 450 formulates a data query to each of the available data services systems for obtaining any required data for a requesting customer as identified by a set-top box identification associated with the customer.

The web services system 450 serves as an abstraction layer between the various data services systems and the application server 410. That is, the application server 410 is not required to communicate with the disparate data services systems, nor is the application server 410 required to understand the data structures or data types utilized by the disparate data services systems.

The web services system 450 is operative to communicate with each of the disparate data services systems for obtaining necessary customer data. The customer data obtained by the web services system is assembled and is returned to the application server 410 for ultimate processing via the middleware layer 434, as described above. An authentication system 452 may include information such as secure user names, subscriber profiles, subscriber IDs, and passwords utilized by customers for access to network services. As will be understood by those skilled in the art, the disparate systems may be integrated or provided in any combination of separate systems, wherein FIG. 4 shows only one example.

Figure 5:
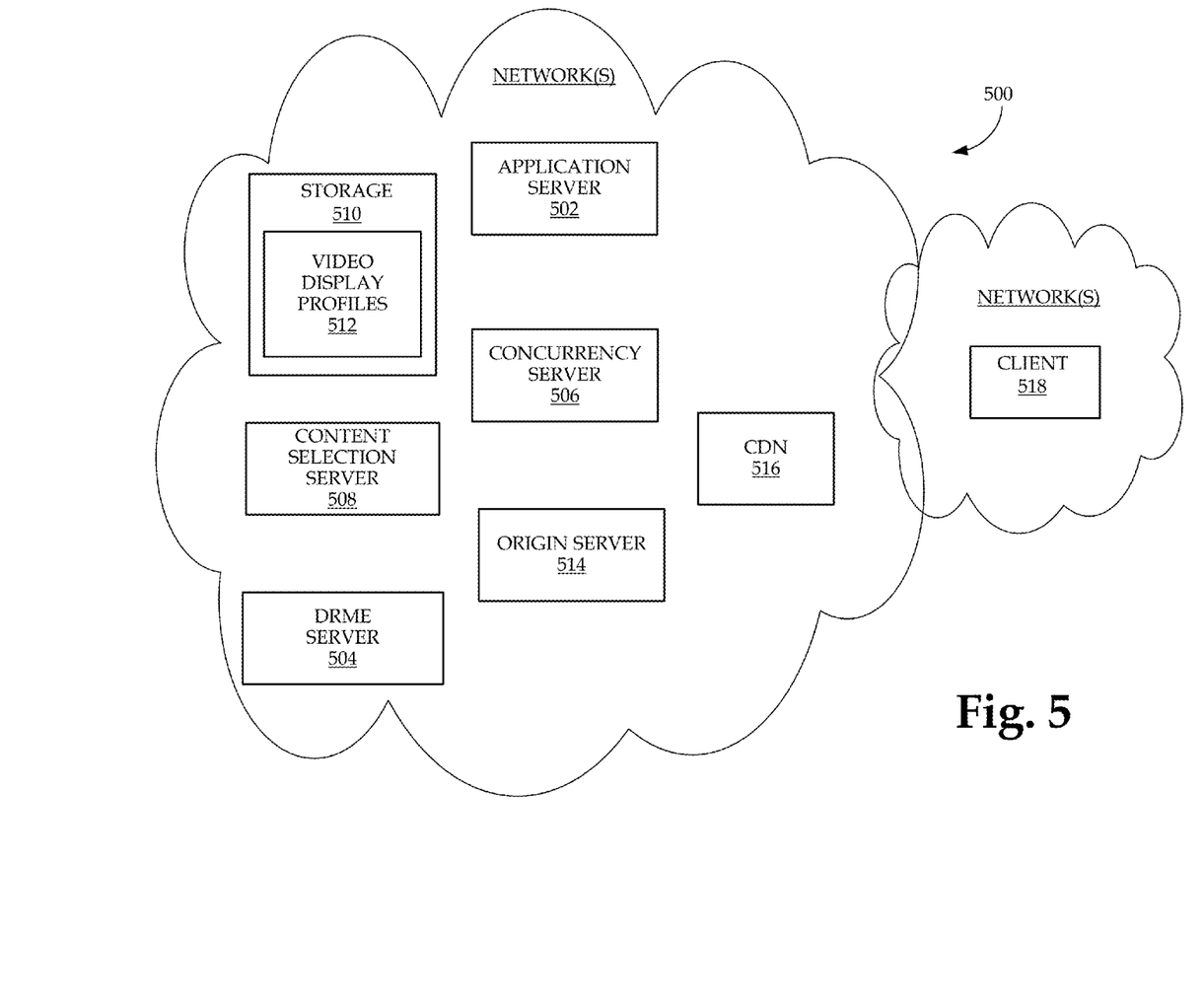
FIG. 5 depicts components of an exemplary communication architecture providing an operating environment according to an embodiment.

FIG. 5 depicts components of an exemplary communication architecture 500 providing an operating environment according to an embodiment configured for streaming video to end-users, but is not so limited. As described below, components of the exemplary architecture 500 are configured in part to control video streaming operations using parameters of a number of video display profiles that account for user actions and inactions while streaming video.

The architecture 500 includes IP-enabled components that provide communication functionality including live video streaming features that utilize a number of video display or bandwidth control profiles to control amounts of available bandwidth consumed by streaming users, but is not so limited. For example, a subscriber can use a tablet computer to stream a live television event using a cable modem, an IP-enabled set top box, or some other networked component without being unduly confined to any particular location in order to view the streaming event.

Users of the architecture 500 can stream video using handheld devices, set-top boxes, and other IP-enabled devices/systems. Compatible consumer devices/systems can use a video streaming or other application to stream video for display using the device/system display. As described above, one or more video display profiles can be generated and/or used for each device/system as part of managing amounts of available bandwidth.

As shown in FIG. 5, the exemplary communication architecture 500 includes infrastructure for delivering and receiving the encoded video. For example, the architecture 500 includes a number server-side components (referred to as server-side), including video transmission and delivery components, and consumer-side components (referred to as client-side), including video reception and display components. The architecture 500 includes functionality to deliver high-speed broadband data signals to end-users. For example, data over Cable System Interface Specifications (DOCSIS), a protocol elaborated under the leadership of Cable Television Laboratories, Inc., provides an industry standard for two-way communications over HFC cable plants.

The architecture 500 includes an IP backbone comprising a packet-switched network, such used for the Internet, wireless communication, ADSL and CATV. The IP backbone can be used to distribute a rich array of digital content, including video streaming, to a variety of client applications. The exemplary network of FIG. 5 is a distributed system that includes a plurality of servers dispersed throughout the distribution network to distribute digital content.

The exemplary architecture 500 includes an application server 502, digital rights management and encryption (DRME) server 504, concurrency server 506, content selection server (CSS) 508, storage 510 for storing information including video display profiles 512, an origin server 514, and a content delivery network (CDN) 516 including cache, but is not so limited. In addition to video display profiles, user device/system profiles can be used to track particular devices/systems that have been used to access video content.

Thus, video display profiles can be more efficiently provided to and/or used by customers since the user device/system profiles and/or locations may be known beforehand or at the time of connecting to a video over IP service. The application server 502 of an embodiment also includes bandwidth control features that can be used to control allocations of available bandwidth based in part on parameters of each video display profile being used by a client computing device/system 518 (referred to below as client 518).

The architecture 500 can be used to support many different types of devices/systems, wherein video display profiles can be used to control streaming parameters to each device/system based in part on the type of user device/system and/or an action associated with a video application or video playback window. It will be appreciated that an IP-enabled STB can be used to support the delivery of streaming video to user devices/systems. For example, IP-enabled set-top boxes can be controlled by a middleware platform located at a headend to provide linear IP video MPEG by encapsulating packets for transmission across the architecture 500. Video can be delivered using a cable modem termination system (CMTS), quadrature amplitude modulator (QAM) components, or some other protocol.

The architecture 500 enables broad access to content placed of a content delivery network (CDN) 516 including content accessible by users via the Internet or some other network. CDNs typically function by receiving requests from clients, checking a local cache for a copy of the requested resource, querying the origin server 514 if the requested video is not included in the cache or has expired for example, and then returning the resource to the client and storing it in cache for use with future requests. CDN servers are typically strategically located at the edges of various networks to limit loads on network interconnects and backbones. CDN servers can be redundantly deployed and interact with other CDN servers to respond to content requests from clients in attempts to optimize content delivery. For example, network edge servers can enable ease of browsing, navigating and streaming of content, including streaming live video.

The CSS 508 can use information, including metadata, for linear and non-linear programs for analyzing, categorizing, processing, storing, and linking with other available data for creating a linear program guide. Components can be operatively connected with a data hub for providing and receiving data in association with programming content and availability, business rules, profiles, devices/systems, etc. The CSS 508 may receive metadata for non-linear programs/content from the application server 502 or other server, as well as metadata from other service provider content sources, such as Video On Demand (VOD), and other video content available through a network that includes a plurality of Internet content sources.

Additionally, the CSS 508 may receive customer's purchased content, content available from a personal or customer cloud, and/or content from other service provider clouds. Content metadata may be categorized based on the availability and sent to customer's devices/systems for maintaining or using the program guide data. Depending on the particular customer set-up, a customer may employ different networked components, including a WiFi/Ethernet network to receive video over IP, including but not limited to, a modem, set-top box/cablecard, game console, DVR, smart phone, desktop, laptop, etc.

A typical implementation example may include a subscriber using a tablet, slate phone, smart television and the like to view video programming using a high speed Internet service, a video streaming application, and a DOCSIS modem, eMTA, or gateway. A WiFi/Ethernet network can receive data and transfer data to an appropriate consumer device/system via an IP-enabled STB, and also receive data from any device/system for transmission to other components of the architecture 500. An exemplary IP-enabled STB can receive content from a distribution or other network for displaying on a user device/system and/or feedback from the device/system. It will be appreciated that there are different types of communication networks and associated components that can be used to deliver video and other content to consumer devices, including smart televisions, tablet computers, laptop computers, desktop computers, etc. Compatible consumer devices/systems can use an application to stream video for display using the device/system display.

While a certain number and configuration of servers and other components/features are described herein, it will be appreciated that other embodiments and defined configurations for providing video streaming features can be implemented. It will be appreciated that some of the described embodiments include a collection of computing devices/systems and data storage components operating at a single location as well as distributed computing embodiments where one or more of the components may be located at disparate locations relative to other components, all of which may be coupled via a distributed computing network, such as the Internet or an intranet.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet.

An example use case illustrates use of one or more video display profiles to control bandwidth usage by an end-user. As described above, video display profile parameters can be used to control a streaming bit rate used by the end-user to view video at various quality levels or stream audio only. The origin server 514 of an embodiment is configured to receive video information in the form of video files and/or manifest files. For example, an encoder can be used to encode source video into a number (e.g. three, four, five, etc.) of adjustable bandwidth profiles (sizes) and output IP multicast to stream shapers that operate to encrypt and segment the video into file chunks (e.g., ten (10) second chunks) to continuously post and delete (e.g., HTTP POST & DELETE) video files and/or manifest files (e.g., playlists) to the origin server 514. In an embodiment, the DRME server 504 is configured to update video encryption keys (e.g., Video Transport Stream (TS) encryption keys) for associated stream shapers on some update frequency (e.g., every 10 hours).

The origin server 514 can be configured to wait for requests (e.g., HTTP GET) from the CDN 516 to stream files to the client 518 or multiple clients. For this example, on startup, the client 518 establishes a connection with the application server 502 to obtain configuration parameters and/or a location of a dedicated authentication system which can be determined by an IP address associated with the client request. The client 518 of an embodiment can be configured to open a session with the concurrency server 506 upon launch to register the client 518 and/or release a content token as part of shutting down or some other stopping action. The client 518 of such an embodiment can also be configured to open a session with the DRME server 504 to obtain digital rights management and/or token information at the time of launch, shutdown, and/or for every channel change.

The user can enter login credentials to issue an authentication request to access video streaming services. After successfully logging in, the client 518 operates to open a session with the application server 502 to obtain the user(s) line-up and populate client guide data in an associated user interface. The CSS 508 determines the correct channel line-up and populates and updates the guide data on the application server 502 (e.g., update every 10 hours). Then, the client 518 determines a nearest or otherwise available CDN cache using a domain name system (DNS) (assuming hosted domain) and sends requests (e.g., HTTP GET) for manifest (playlist) and video files (e.g., video transport stream (TS) format) to begin streaming audio, video, and/or data.

In one embodiment, the client 518 is configured to automatically select a video display profile to use based in part on a size, configuration, and/or other aspect of a video display view. The client 518 can be configured to use the best possible profile. As the user adjusts or performs some other action that otherwise affects the video display view, the client 518 can be configured to automatically select the correct or relevant video display profile to adjust streaming parameters. As described above, video display profiles can be retrieved from the application server 502 or other component and/or stored locally based in part on a particular device/system type and/or video display view configuration. The example devices and systems discussed herein are for purposes of example and illustration and are not limiting of a vast number of configurations that may be utilized for practicing various embodiments.

Figure 6:
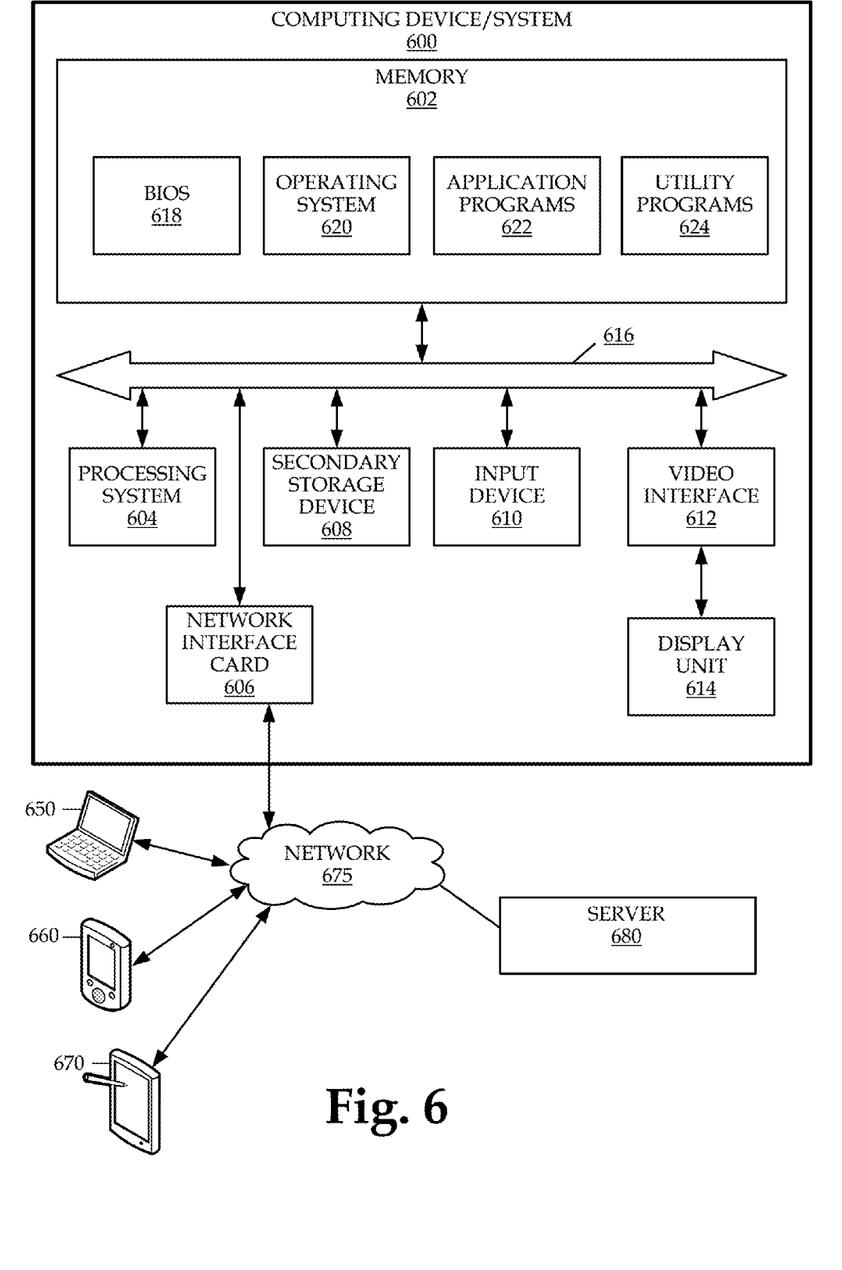
FIG. 6 is a block diagram illustrating exemplary components of a computing device 500 with which embodiments may be practiced.

FIG. 6 is a block diagram illustrating exemplary components of a computing device 600 with which embodiments may be practiced. In some embodiments, the application server 104 or other server may be implemented using one or more computing devices like the computing device 600. It should be appreciated that other embodiments may be implemented using computing devices having hardware and/or software components other than those illustrated in the example of FIG. 6.

Computing devices/systems may be implemented in different ways in different embodiments. For the example of FIG. 6, the computing device 600 includes a processing system 604, memory 602, a network interface 606, a secondary storage device 608, an input device 610, a video interface 612, a display unit 614, and a communication medium 616. In other embodiments, the computing device 600 may be implemented using more or fewer hardware components (e.g., a video interface, a display unit, or an input device) or in combination with other types of computer systems and program modules.

The memory 602 includes one or more computer-readable storage, computer storage, or computer-readable storage media capable of storing data and/or computer-executable instructions. Memory 602 thus may store the computer-executable instructions that, when executed by processor 604, cause the application server 104 to allow broad access to content placed on a content delivery network (CDN).

In various embodiments, the memory 602 is implemented in various ways. For example, the memory 602 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 604 includes one or more processing units, which may include tangible integrated circuits that selectively execute computer-executable instructions. In various embodiments, the processing units in the processing system 604 are implemented in various ways. For example, the processing units in the processing system 604 can be implemented as one or more processing cores. In this example, the processing system 604 can comprise one or more core microprocessors. In another example, the processing system 604 can comprise one or more separate microprocessors. In yet another example embodiment, the processing system 604 can comprise Application-Specific Integrated Circuits (ASICs) that provide specific functionality. In yet another example, the processing system 604 provides specific functionality by using an ASIC and by executing computer-executable instructions.

The computing device 600 may be enabled to send data to and receive data from a communication network via a network interface 606. In different embodiments, the network interface 606 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 608 includes one or more computer-readable storage media, and may store data and computer-executable instructions not directly accessible by the processing system 604. That is, the processing system 604 performs an I/O operation to retrieve data and/or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 610 enables the computing device 600 to receive input from a user. Example types of input devices include, but are not limited to, keyboards, mice, trackballs, stylus input devices, key pads, microphones, joysticks, touch-sensitive display screens, and other types of devices that provide user input to the computing device 600.

The video interface 612 outputs video information to the display unit 614. In different embodiments, the video interface 612 is implemented in different ways. For example, the video interface 612 is a video expansion card. In another example, the video interface 612 is integrated into a motherboard of the computing device 600. In various embodiments, the display unit 614 can be a an LCD display panel, a touch-sensitive display panel, an LED screen, a projector, a cathode-ray tube display, or another type of display unit. In various embodiments, the video interface 612 communicates with the display unit 614 in various ways. For example, the video interface 612 can communicate with the display unit 614 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 616 facilitates communication among the hardware components of the computing device 600. In different embodiments, the communications medium 616 facilitates communication among different components of the computing device 600. For instance, in the example of FIG. 6, the communications medium 616 facilitates communication among the memory 602, the processing system 604, the network interface 606, the secondary storage device 608, the input device 610, and the video interface 612. In different embodiments, the communications medium 616 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618, and an operating system 620. The BIOS 618 includes a set of software instructions that, when executed by the processing system 604, cause the computing device 600 to boot up. The operating system 620 includes a set of software instructions that, when executed by the processing system 604, cause the computing device 600 to provide an operating system that coordinates the activities and sharing of resources of the computing device 600. The memory 602 also stores one or more application programs 622 that, when executed by the processing system 604, cause the computing device 600 to provide applications to users. The memory 602 also stores one or more utility programs 624 that, when executed by the processing system 604, cause the computing device 600 to provide utilities to other software programs.

Embodiments of the present invention may be utilized in various distributed computing environments where tasks are performed by remote processing devices that are linked through a communications network in a distributed computing environment.

Moreover, embodiments may be implemented such that each or many of the components illustrated in FIG. 6 may be integrated onto a single integrated circuit. When operating via such a single integrated circuit, the functionality, described herein, may be operated via application-specific logic integrated with other components of the computing device/system 600 on the single integrated circuit.

A server 680 may provide other services to client devices. As one example, server 680 may be a web server providing web services over the web network 675. Example clients include computing device 650, which may include any general purpose personal computer (such as computing device 600), a tablet computing device 670 and/or mobile computing device 660, such as smart phones.

Figure 7A:
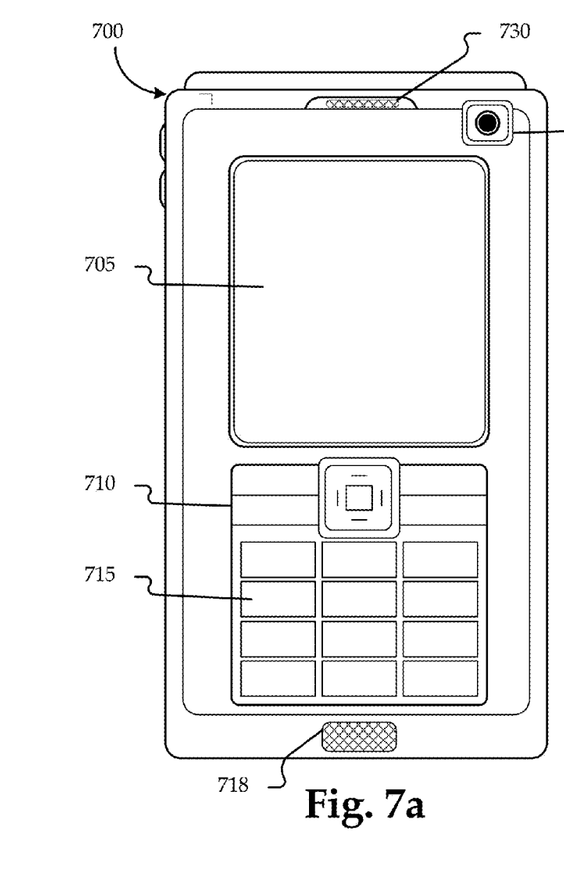
FIGS. 7a-7b illustrate an exemplary mobile computing environment in which which embodiments may be practiced.
Figure 7B:
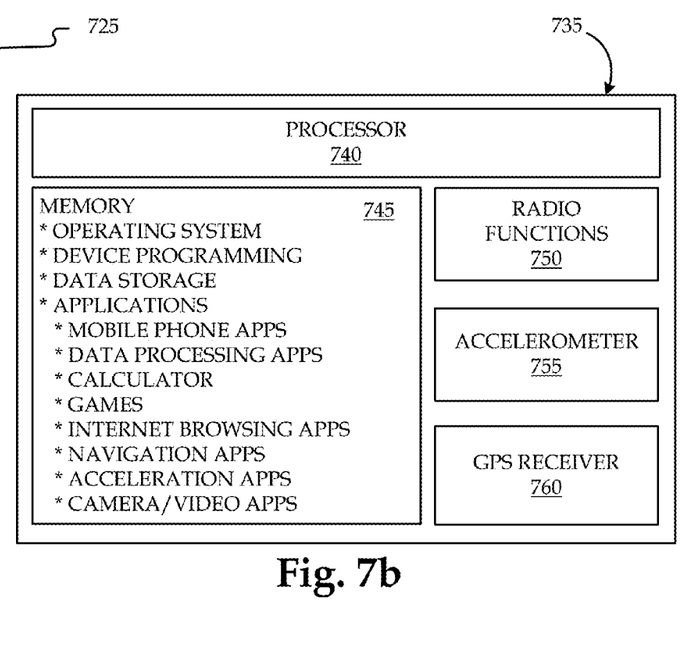

FIGS. 7a-7b illustrate an exemplary mobile computing environment comprising a mobile computing device 700 such as a smart phone, a tablet or slate computer, a laptop computer, and the like, with which embodiments may be practiced. The mobile computing device 700 is illustrative of any suitable device operative to send, receive and process wireless communications according to embodiments of the present invention. A display screen 705 is operative for displaying a variety of information such as information about incoming and outgoing communications, as well as, a variety of data and displayable objects, for example, text, alphanumeric data, photographs, and the like.

Data input to the device 700 may be performed via a variety of suitable means, such as, touch screen input via the display screen 705, keyboard or keypad input via a data entry area 710, key input via one or more selectable buttons or controls 715, voice input via a microphone 718 disposed on the device 700, photographic input via a camera 725 functionality associated with the mobile computing device, or any other suitable input means. Data may be output via the device 700 via any suitable output means, including but not limited to, display on the display screen 705, audible output via an associated speaker 730 or connected earphone system, vibration module for providing tactile output, and the like.

Referring now to FIG. 7b, operational unit 735 is illustrative of internal operating functionality of the mobile computing device 700. A processor 740 is illustrative of a general purpose computer processor for processing incoming and outgoing data and communications and controlling operation of the device and associated software applications via a mobile computing device operating system. Memory 745 may be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 700 may contain an accelerometer 755 for detecting acceleration, and can be used to sense orientation, vibration, and/or shock. Mobile computing device 700 may contain a global positioning system (GPS) system (e.g., GPS send/receive functionality) 760. A GPS system 760 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 750 include all required functionality, including onboard antennae, for allowing the device 700 to communicate with other communication devices and systems via a wireless network. Radio functions 750 may be utilized to communicate with a wireless or WIFI-based positioning system to determine a device location.

Although described herein in combination with mobile computing device 700, in alternative embodiments the invention may be used in combination with any number of computer systems, such as in desktop environments, laptop or notebook computer systems, multiprocessor systems, microprocessor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method comprising:
   using a video playback window to stream video over a communication network at a first streaming bit rate;
   determining when a first action affects a first portion of the video playback window to necessitate use of a first video display profile;
   using parameters of the first video display profile to stream the video at a second streaming bit rate when the first action necessitates use of the first video display profile or continuing to stream the video at the first streaming bit rate;

determining when a second action affects a second portion of the video playback window to necessitate use of a second video display profile; and using parameters of the second video display profile to stream the video at a third streaming bit rate if the second action necessitates use of the second video display profile or continuing to stream the video at one of the first or the second streaming bit rates.

2. The method of claim 1, further comprising streaming the video at a lower bit rate using the first or the second video display profile to thereby conserve amounts of available bandwidth, wherein the first video display profile corresponds to a first range of video playback window sizes and corresponding streaming bit rates and the second video display profile corresponds to a second range of video playback window sizes and corresponding streaming bit rates.

3. The method of claim 1, further comprising using a third video display profile after a resize operation that decreases a size of the video playback window to stream the video at a lower rate than defined by the first or the second video display profile.

4. The method of claim 1, further comprising streaming audio only when focus shifts from the video playback window or when the focus is away from the video playback window.

5. The method of claim 1, further comprising providing video display profiles that include a range of display dimensions and associated bit rates for each device type.

6. The method of claim 1, further comprising selecting a display profile based in part on a device or system type.

7. The method of claim 1, further comprising using the second display profile to stream the video based in part an amount of viewable area associated with the video playback window.

8. The method of claim 1, further comprising streaming the video at a higher bit rate using the second display profile.

9. The method of claim 1, further comprising storing each video display profile locally or remotely.

10. The method of claim 1, further comprising implementing video streaming parameters based in part on user focus with respect to the video playback window.

11. The method of claim 1, further comprising ascertaining a user focus in relation to the video playback window including using a video camera to determine if a user is viewing the video.

12. A system comprising:
a server including processor and memory resources, the server configured to:
identify a first video display profile based in part on aspects of a video display area used to stream video in response to a first action that affects a first portion of the video display area;
provide the video using a bit rate defined in part by parameters of the first video display profile;
identify a second video display profile based in part on aspects of the video display area in response to a second action that affects a second portion of the video display area; and
provide the video using a bit rate defined in part by parameters of the second video display profile.

13. The system of claim 12, wherein the server provides video display profiles to each client of an IP network based in part on a device or system type.

14. The system of claim 12, wherein the server is further configured to force a client device to a lower bit rate after a video window resize operation.

15. The system of claim 12, wherein the server is further configured to receive information from a client corresponding to a current device type or display configuration.

16. The system of claim 12, wherein the server is further configured to publish video display profiles for each device type, wherein each video display profile includes a video streaming bit rate corresponding to a range of video display sizes.

17. The system of claim 12, wherein the server is further configured to identify the second video display profile based in part on a difference in size between an original size of the video display area and a subsequent size of the video display area.

18. A non-transitory computer readable medium including instructions that when executed by a processor operate to:
select a first video display profile to control a stream of video based on an original size of a video window used to display the video;
stream the video using streaming parameters of the first video display profile;
display the video in the video window at the original size;
receive an input associated with a resize operation that resizes the video window to a resized video window;
capture dimensions of the resized video window;
select a second video display profile that corresponds with the dimensions of the resized video window;
use streaming parameters of the second video display profile to stream the video; and
display the video in the resized video window.

19. The computer readable medium of claim 18, wherein the instructions are further configured to identify video display profiles based in part on a type of user device and user focus with respect to one of the video window or the resized video window.

20. The computer readable medium of claim 18, wherein the instructions are further configured to use video display profiles that include video window size or screen size to bit rate correlations.

* * * * *